J. W. BRYCE.
PROGRAM BATTERY CHARGING DEVICE.
APPLICATION FILED OCT. 29, 1918.
1,382,622.
Patented June 28, 1921.
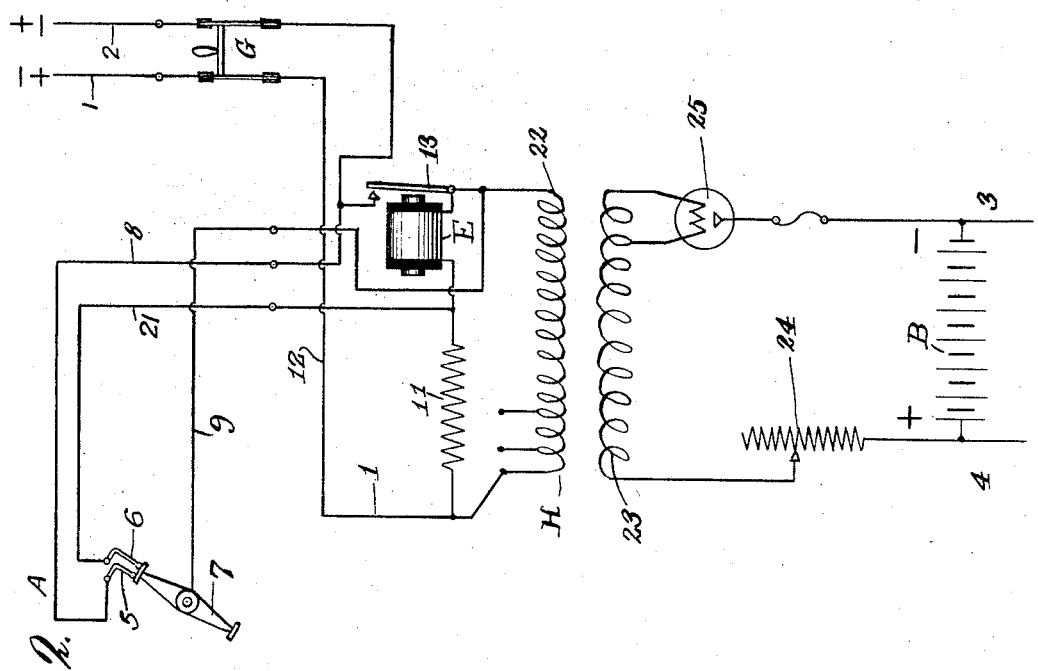
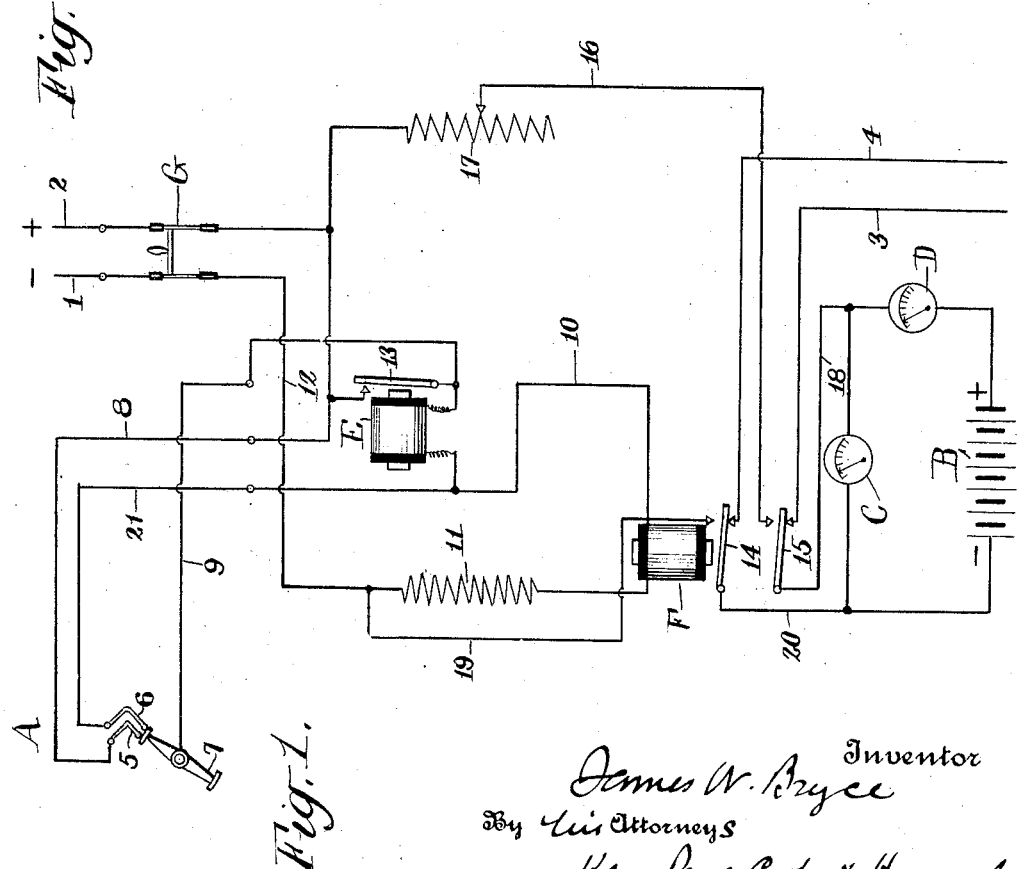
Inventor
James W. Bryce
By his Attorneys
Kerr, Page, Cooper & Hayward.

UNITED STATES PATENT OFFICE.

JAMES W. BRYCE, OF BINGHAMTON, NEW YORK, ASSIGNOR TO THE INTERNATIONAL TIME RECORDING COMPANY OF NEW YORK, A CORPORATION OF NEW YORK.

PROGRAM BATTERY-CHARGING DEVICE.

1,382,622.   Specification of Letters Patent.   Patented June 28, 1921.

Application filed October 29, 1918. Serial No. 260,109.

*To all whom it may concern:*

Be it known that I, JAMES W. BRYCE, a citizen of the United States, residing at Binghamton, in the county of Broome and State of New York, have invented certain new and useful Improvements in Program Battery-Charging Devices, of which the following is a full, clear, and exact description.

When storage batteries are used in time clock systems to furnish the current energy necessary for operating the secondary clocks and such devices as time, cost and other recorders, the necessity for keeping them properly charged has heretofore presented a somewhat serious problem. Usually with such systems there has been provided a potentiostat which is a device in the nature of a relay which depends for its action on the fall of potential of the battery as it discharges. The controlling magnet of this device in a circuit across the battery terminals is so adjusted that when the potential of the battery falls a predetermined amount the armature of the magnet closes a circuit which throws a charging current onto the battery, and again on the rise of potential due to charging to the full amount, cuts off such charging circuit.

Again, it is well known that it is quite possible to keep low voltage batteries charged by the so-called "floating" process which involves the connection of the battery with the charging circuit in series with a resistance through which it is charged continuously. This plan is not, however, free from objection as it not infrequently happens that grounds appear on the charging as well as on the clock or working lines, by which the resistance becomes short-circuited with the result that the clock line receives the full charging line voltage to the serious detriment of the clock mechanism. Some batteries, moreover, render this system disadvantageous, so that it has heretofore been customary in many cases to use two sets of batteries and to charge one while the other is discharging. This involves, manifestly, a very expensive installation.

The urgent need of a system which will keep the batteries charged at all times, and which will practically insulate the charging from the battery working circuits has led me to devise the system which forms the subject of the present application. According to the plan which I have originated for this purpose, I employ but a single battery and for said battery I use a low charging rate. I completely insulate the clock lines from the charging circuit and I maintain the battery on the clock lines without reference to the presence of current on the charging circuit.

My improvement involves other advantages in that the interruption of the charging current will not upset, except for that particular interruption the scheme or program of charging; in that there are no breaks of any circuit in the master clock so that its contacts are sparkless, and in that a small current capacity in the relays is required even for large equipments, which means simplification and reduction of cost of installation and maintenance.

The invention is based upon the fundamental principle that in all impulse time clock systems a known amount of energy is taken from the battery by each current impulse, such impulses usually occurring once a minute; hence, if the time during which the discharging current is on be known, it will also be known exactly how much of a charge will be required to replace the energy drawn out.

The means which I have devised for carrying out this invention are illustrated in the accompanying drawings in which:

Figure 1 is a diagram of the system as adapted for use with direct current, and

Fig. 2 a similar diagram of the same system adapted for use with alternating current charging circuits.

In these drawings A designates a master clock having two stationary contacts 5 and 6, and a rotary contact 7, which for purposes of illustration may be assumed to make one revolution a minute and in its movement to successively engage the said two contacts 5 and 6.

B is a storage battery which is used under the control of the master clock in well known ways to operate the devices in the clock line 3, 4; C is a voltmeter in parallel to the battery; D an ammeter in series therewith, these being the well known and usual arrangements of such devices in systems of this character.

E and F are relays the functions of which will be hereinafter set forth, and 1 and 2 are the wires of the charging circuit containing a switch G of the usual and known kind.

The two contacts 5 and 6 in the master clock in conjunction with the contact arm 7 operate, the first-named at fifteen seconds after each minute and the latter at fifteen seconds of the next minute, to connect up and disconnect the charging circuit with the battery, thus leaving the battery on and off charge for one half of each minute. This is accomplished in the following manner: When the contact is made with 5, current flows from wire 2 to wire 8, through contacts 5 and 7 to wire 9, through the relay magnet E through wire 10, through relay F, resistance 11, and back to line wire 1 through wire 12. Both relays E and F are thus energized and the first named, by the attraction of its armature 13, is connected up in circuit with the source of charging current in series with relay F by the connection of the wire 2 with the wire 10 through coil of magnet E, so that it remains closed although the contact at 5 may be only momentary. The relay F, on the other hand, by the attraction of its two armatures 14 and 15, connects wire 16 from wire 2 which contains an adjustable resistance 17 through wire 18 with one pole of the battery B, and through wire 19 from wire 12 through wire 20 with the other pole.

The battery is thus charged by a current of proper strength for one-half minute, at the end of which period the contact is made at 6. By this means the circuit is closed through wire 9, contacts 7 and 6, wire 21, and winding of magnet E, thus short-circuiting the relay E and allowing its armature 13 to fall off. This breaks the charging circuit from the battery, but leaves the clock line circuit 3, 4 connected therewith, since the circuit of magnet F is broken by the release of armature 13, causing magnet F to drop armatures 14 and 15 to connect with lines 3 and 4, the wire 4 through armature 14 and wire 20 to one pole, and the wire 3, through armature 15 and wire 18 to the other. For a period of one-half minute therefore the battery under the control of the master clock may send impulses over the clock line in the usual manner.

The invention is applicable to alternating as well as to direct current systems, as may be seen by reference to Fig. 2. In this case but one relay corresponding to relay E is required, its armature 13 being connected with one terminal of the primary 22 of a transformer H, while the other line wire 1 runs directly to the other terminal of said transformer.

In the secondary 23 of the transformer is included a "Tungar" bulb, or chemical valve 25, for producing a continuous current, and an adjustable resistance 24 for varying the charging rate.

In this case it is not necessary that contacts 5 and 6 should make and break the circuit every minute, as the clock line from the storage battery B is always insulated from the source of charging current by means of the coils of the transformer G. They may therefore make and break at any other interval that may be required for the proper operation of the system.

In all material respects other than noted the operation of the system illustrated in Fig. 2 is the same as that of the system of Fig. 1 and need not be set forth in greater detail. In either case the clock circuit is insulated from the charging circuit, and the battery is kept charged at all times. It may be slightly overcharged, if so desired, in order that any periodic failure of the charging current may be compensated for.

Having now described my invention what I claim is:

1. In a system of the kind described, the combination with a source of charging current, a storage battery, a charging circuit, and a clock line adapted to receive current from the battery, of relays, time controlled contacts for alternately making and breaking the circuit of said relays and connections between the charging circuit and the battery and between the battery and the clock line controlled by said relays whereby the battery is for alternate periods connected to the charging circuit and to the clock line.

2. In a system of the kind described, the combination with a source of charging current, a storage battery, a charging circuit, time controlled relays, and a clock line adapted to be connected by said relays to the battery, the clock line being at all times insulated from the charging circuit.

3. In a system of the kind described, the combination with a source of charging current, a storage battery, a charging circuit and a clock line adapted to receive current from said battery, of a relay, clock operated contacts for energizing and deënergizing said relay, circuit connections adapted to be controlled by the relay for maintaining it in circuit after it has been energized by one contact and until it is deënergized by another and means controlled by the current through said relay for connecting the said charging circuit to the battery while the first relay is energized and connecting the clock line to the battery while said relay is inactive.

4. In a system of the kind described, the combination of a source of charging current, a storage battery, a charging circuit and a clock line adapted to receive current from the battery, connections between the charging circuit and the battery, and between the battery and the clock line, time controlled means for controlling the charging circuit and adapted to be operated by the conditions of such circuit to alternately connect the battery with the source of charging current and the clock line.

In testimony whereof I hereunto affix my signature.

JAMES W. BRYCE.